June 18, 1940. P. A. ROSSI 2,204,825
DOUGH ROLLING AND CUTTING DEVICE
Filed Feb. 13, 1939
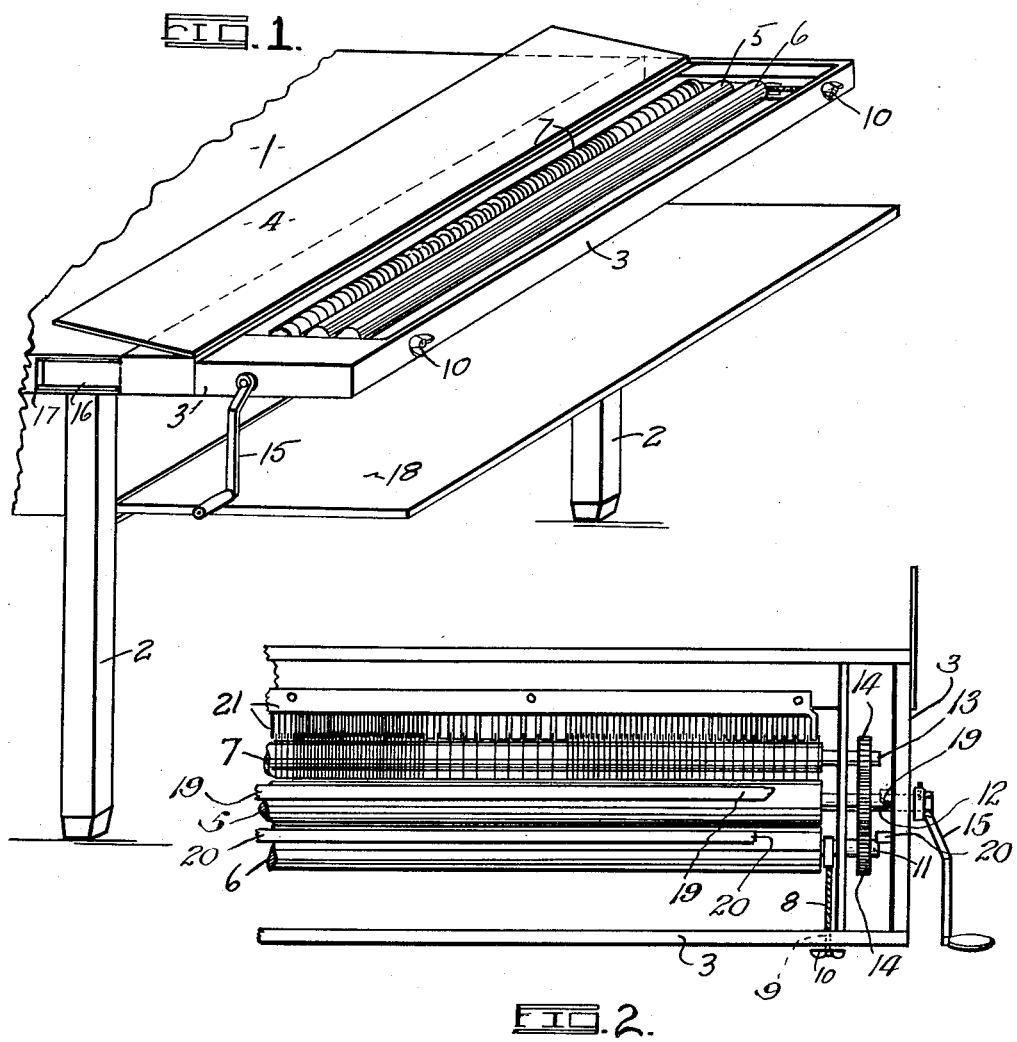
Pietro Antonio Rossi
INVENTOR,
BY W. B. Harpman
ATTORNEY.

Patented June 18, 1940

2,204,825

UNITED STATES PATENT OFFICE 2,204,825

DOUGH ROLLING AND CUTTING DEVICE

Pietro Antonio Rossi, Youngstown, Ohio

Application February 13, 1939, Serial No. 256,056

2 Claims. (Cl. 107—22)

This invention relates to a dough rolling and cutting device.

The principal object of this invention is the provision of a dough rolling and cutting device adapted to be removably positioned upon an end of a kitchen table or cabinet.

A further object of this invention is the provision of a dough rolling and cutting device comprising a plurality of horizontally positioned rolls, one or more of which is adapted to be formed of a plurality of circular knives.

A still further object of this invention is the provision of a dough rolling and cutting device providing convenient adjusting means for varying the tension upon the dough rolling and cutting portions thereof.

A still further object of this invention is the provision of a dough rolling and cutting device so formed that it can be conveniently attached to the end of a table by means of bracket engaging members formed thereon, and provided with a hinged top section which, when in closed position, creates in effect an extension of the said table.

The dough rolling and cutting device shown and described herein has been designed to enable the housewife to conveniently roll pie dough with a minimum of effort and to make macaroni, noodles, and the like without the necessity of laboriously hand rolling a quantity of dough and cutting the same with a knife which has heretofore been the custom. The dough rolling and cutting device has been formed in a flat compact unit and provided with means for attachment to the end of an ordinary kitchen table. Thus the device can be positioned upon the end of an ordinary kitchen table and due to its construction and form be utilized as an extension of the same table. It will thus be seen that the positioning of the device makes it possible for the housewife to mix the dough on the table, roll it to the desired thickness by utilizing the roller portions of the device and cut the same into any of several different widths by utilizing the knife sections of the device. It is desirable that the table upon which the dough rolling and cutting device be positioned be equipped with a sliding shelf a relatively short distance below the dough rolling and cutting device so as to receive the rolled dough, cut macaroni, or noodles conveniently.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein—

Figure 1 is a perspective view of a portion of a table showing the dough rolling and cutting device positioned on one end thereof with a sliding board provided on the table structure just below the dough rolling and cutting device.

Figure 2 is a bottom elevation of the left half of the dough rolling and cutting device shown in Figure 1, showing in detail the means provided for clearing the dough from the rolls and the knives thereof and the adjustment, bearing and gearing details.

By referring to the drawing and Figure 1 in particular it will be seen that a table having a top 1 and legs 2 has been provided at one end thereof with a dough rolling and cutting device comprising a rectangular frame 3, a hinged top section 4 and a plurality of dough rolling and cutting rolls positioned in said frame. The dough rolling and cutting rolls comprising a pair of plain rolls 5 and 6 and a knife roll 7. The knife roll 7 is formed of a plurality of circular metal knives with suitable spacers positioned between the same and is preferably arranged so that several groups of knives will provide several optional widths of cut dough.

The plain rolls 5 and 6 are positioned immediately adjacent to the knife roll 7 and it will be seen that the plain roll 5 serves as a backup roll for the knife roll 7 in cutting dough and that the plain roll 5 and plain roll 6 serve as dough rolling rolls when the dough is passed between them. In order that various thicknesses of dough may be rolled in the device, suitable adjustment means have been provided wherein threaded bolts 8 are positioned thru threaded openings 9 in the rectangular frame 3 and are provided with convenient wing nut heads 10 so that they may be easily rotated. Their inner ends are journaled upon shafts 11 of the plain roll 6 in such manner that when these adjustment bolts 8 are turned inwardly, the plain roll 6 is moved horizontally against the plain roll 5 which in turn moves against the knife roll 7, it being understood that shafts 12 and 13 (see Figure 2) supporting these rolls are carried in suitable slot-like structure in a bracket portion of the rectangular frame 3 so that they may be moved horizontally. In this connection it will be seen that the shafts 11, 12 and 13 are geared to one another by suitable gears 14, the gear teeth of which are sufficiently long to provide engagement even though the shafts upon which they are carried may be moved slightly in relation to one another. It will also be seen that the shaft 12 extends outwardly thru the rectangular frame 3 and is squared so as to receive a crank 15. This crank 15 being positioned on the squared end of the shaft 12 by means of a simple friction catch so that the crank 15 may be readily removed and replaced at will.

By referring to Figures 1 and 2 of the drawing it will be seen that the dough rolling and cutting device is adapted to be positioned upon the end of a kitchen table or cabinet by means of arm-like brackets 16 formed in each side of the rectangular frame 3. These arm-like brackets 16 are adapted to slidably engage and lock into mounting brackets 17 positioned on the sides of the said table. In selecting a table upon which to attach the dough rolling and cutting device shown herein, it is desirable to have one equipped with a sliding shelf such as that indicated at 18, in Figure 1. The sliding shelf 18 providing a convenient place to receive the rolled or cut dough.

In order that the dough being passed thru the rolls of this device will not stick to the rolls suitable scraper bars 19 and 20 are provided on the bottom of the rectangular frame 3 (see Figure 2) and are adapted to engage the rolls 5 and 6 so as to guide the dough away from them. In order that the dough will not be retained between the circular knives of the knife roll 7 a comb-like scraper 21 has been provided on the bottom of the rectangular frame 3, the various teeth portions of the comb-like scraper 21 being adapted to engage the knife roll 7 in the spaces between the circular knives thereon so as to effectively remove cut dough therefrom.

What I claim is:

1. A dough rolling and cutting device comprising a rectangular frame, a plurality of rolls positioned in the said frame by means of shafts extending from the ends of the said rolls and engaging slot-like openings in the said frame, means for moving the rolls in relation to the slot-like openings in the said frame so as to vary the pressure of the rolls upon each other, the said means comprising threaded bolts functioning in threaded openings in the said frame and having their inner ends journaled upon the shafts of one of the said rolls, gears positioned on the said shafts and a crank positioned on one of the said shafts providing for the rotation of the said rolls, dough scraping means formed on the said frame and positioned adjacent to the said rolls and comprising flat scraper bars engaging the surfaces of the said plain rolls and a comb-like scraper bar engaging the said knife roll between the individual circular knives thereof and means for attaching the rectangular frame to the end of a table.

2. A dough rolling and cutting device comprising a plurality of rolls positioned in a rectangular frame, the said plurality of rolls comprising a pair of plain rolls adapted to roll dough and a knife roll adapted to cut dough, gears positioned on the said rolls together with a crank positioned on one of the said rolls so that the same may be rotated thereby, a hinged top portion formed on said frame and adapted to cover the said rolls when the same are not being used, means for attaching the said frame to the end of a table so that the said frame and its closed top portion form a flat extension on the said table, scraper bars positioned on the said frame adapted to remove the dough from the said rolls, the said scraper bars comprising flat bars engaging the said plain rolls and a bar engaging the said knife roll, means for varying the thickness of the dough being rolled comprising threaded bolts positioned in the said frame and having the inner ends journaled upon one of the said rolls so that the said rolls may be moved into closer association therethru.

PIETRO ANTONIO ROSSI.